United States Patent
Yang

(10) Patent No.: US 12,213,064 B2
(45) Date of Patent: Jan. 28, 2025

(54) METHOD FOR WIRELESS COMMUNICATION AND DEVICE

(71) Applicant: GUANGDONG OPPO MOBILE TELECOMMUNICATIONS CORP., LTD., Guangdong (CN)

(72) Inventor: Haorui Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 350 days.

(21) Appl. No.: 17/726,460

(22) Filed: Apr. 21, 2022

(65) Prior Publication Data

US 2022/0248319 A1    Aug. 4, 2022

Related U.S. Application Data

(63) Continuation of application No. PCT/CN2020/101941, filed on Jul. 14, 2020.

(51) Int. Cl.
*H04W 48/18* (2009.01)
*H04W 48/08* (2009.01)
(Continued)

(52) U.S. Cl.
CPC .......... *H04W 48/18* (2013.01); *H04W 48/08* (2013.01); *H04W 60/04* (2013.01); *H04W 84/042* (2013.01)

(58) Field of Classification Search
CPC ..... H04W 48/08; H04W 48/18; H04W 60/04; H04W 48/042
See application file for complete search history.

(56) References Cited

U.S. PATENT DOCUMENTS

| | | |
|---|---|---|
| 2019/0200209 A1 | 6/2019 | Velev et al. |
| 2020/0162919 A1 | 5/2020 | Velev et al. |

(Continued)

FOREIGN PATENT DOCUMENTS

| | | |
|---|---|---|
| CN | 108323245 A | 7/2018 |
| CN | 110225563 A | 9/2019 |

(Continued)

OTHER PUBLICATIONS

3GPP TSG-CT WG1 Meeting #124-e, C1-203801 (Revision of C1-203325), Electronic meeting, Revision, Correction on allowed NSSAI for UE not supporting NSSAA, OPPO, Jun. 2-10, 2020. (29 Pages).

(Continued)

*Primary Examiner* — Brian P Cox
(74) *Attorney, Agent, or Firm* — Young Basile Hanlon & MacFarlane, P.C.

(57) ABSTRACT

Methods for wireless communication and devices are provided. The method is applied to a terminal device not supporting network slice-specific authentication and authorization (NSSAA). The method includes receiving, by the terminal device, a first message sent by an access and mobility management function (AMF), and receiving a second message sent by the terminal device, where the first message contains no first single-network slice selection assistance information (S-NSSAI) of visited public land mobile network (VPLMN), a second S-NSSAI is subject to the NSSAA, the second S-NSSAI is an S-NSSAI of home public land mobile network (HPLMN) corresponding to the first S-NSSAI, and the second message is used for requesting for registering with a network slice.

16 Claims, 4 Drawing Sheets

(51) Int. Cl.
*H04W 60/04* (2009.01)
*H04W 84/04* (2009.01)

(56) References Cited

U.S. PATENT DOCUMENTS

| | | | | |
|---|---|---|---|---|
| 2021/0352575 | A1* | 11/2021 | Chun | H04W 74/0833 |
| 2022/0272620 | A1* | 8/2022 | Ninglekhu | H04W 48/18 |
| 2022/0369207 | A1* | 11/2022 | Ianev | H04W 76/18 |

FOREIGN PATENT DOCUMENTS

| | | |
|---|---|---|
| GB | 2593147 A | 9/2021 |
| GB | 2593713 A | 10/2021 |
| WO | 2020080913 A1 | 4/2020 |

OTHER PUBLICATIONS

3GPP TSG-CT WG1 Meeting #120, C1-196443, Portoroz (Slovenia), Preventing UE waiting for completion of NSSAA Indefinitely—Atl2UE timer, NEC, Oct. 7-11, 2019. (41 pages).
Extended European Search Report for EP Application 20945174.9 mailed Sep. 21, 2022. (14 pages).
First Examination Report issued in corresponding IN application No. 202217021890 dated Feb. 28, 2023.
ZTE, AMF capability of Network Slice-Specific Authentication and Authorization, 3GPP TSG-SA WG2 Meeting #134, S2-1907413, Jun. 18, 2019. URL:https://www.3gpp.org/ftp/tsg_sa/WG2_Arch/TSGS2_134_Sapporo/Docs/.
First China Office Action with English Translation issued in corresponding CN application No. 2022104990700 dated Apr. 18, 2023.
Communication pursuant to Article 94(3) EPC for EP Application 20945174.9 mailed Jun. 7, 2023. (9 pages).
3GPP TSG-CT Meeting #88e, E-Meeting, CP-201114, CT1, CR pack on eNS-2, Jun. 29-Jul. 1, 2020. (2 pages).
3GPP TSG-CT WG1 Meeting #123-e Electronic meeting, C1-202172, China Mobile, Huawei, HISilicon, Discussion paper on the impact of non-standard S-NSSAI mapping to NSSAA and NSSAI storage, Apr. 16-24, 2020.
3GPP TSG-CT WG1 Meeting #123-e Electronic meeting, C1-202173, China Mobile, Updating requirements of NSSAA for roaming scenarios, Apr. 16-24, 2020, 7 pages.
3GPP TSG-CT WG1 Meeting #124-e Electronic meeting, C1-203422, China Mobile, Updating the requirements of Rejected NSSAI for UE not supporting NSSAA feature in roaming scenerios, Jun. 2-10, 2020, 36 pages.
3GPP TSG-CT1 Meeting #124-e Electronic meeting, C1-203546, LG Electronics, Enhanced PLMN selection in case of NSSAA fallure in roaming scenario, Jun. 2-10, 2020, 17 pages.
3GPP TSG CT WG1 Meeting #124 Electronic meeting, C1-203737, Huawei, HISilicon, Prevention of loop scenario for 5GMM cause #62, Jun. 2-10, 2020, 1 page.
3GPP TSG-CT WG1 Meeting #124-e Electronic meeting, C1-204170, China Mobile, Updating the requirements of Rejected NSSAI in roaming scenarios, Jun. 2-10, 2020, 48 pages.
3GPP TSG-CT WG1 Meeting #124-e Electronic meeting, C1-204174, China Mobile, Updating the requirements of Rejected NSSAI for UE not supporting NSSAA feature in roaming scenerios, Jun. 2-10, 2020, 36 pages.
3GPP TSG-CT Meeting #88e E-Meeting, CP-201280, China Mobile, Updating the requirements of Rejected NSSAI for UE not supporting NSSAA feature in roaming scenerios, Jun. 29-Jul. 1, 2020, 36 pages.
International Search Report with English Translation for PCT Application PCT/CN2020/101941 mailed Mar. 30, 2021 (15 pages).
3GPP TSG-WG SA2 Meeting #137E e-meeting Elbonia, S2-2002220, Huawei, HiSilicon, Correction on the value of S-NSSAIs for NSSAA, Feb. 24-27, 2020, 7 pages.
Network slicing, TS 23.501, Jul. 9, 2020, 22 pages.
3GPP TS 24.501 V16.4.1 (Mar. 2020), Group Core Network and Terminals; Non-Access Stratum (NAS) protocol for 5G System (5GS); Stage 3; (Release 16), 666 pages.
Notice of Reason for Refusal and English translation issued in corresponding JP Application No. 2022530278, dated May 17, 2024, 8 pages.

* cited by examiner

METHOD FOR WIRELESS COMMUNICATION AND DEVICE

CROSS-REFERENCE TO RELATED APPLICATION(S)

This application is a continuation of International Application No. PCT/CN2020/101941, filed on Jul. 14, 2020, the entire disclosure of which is hereby incorporated by reference.

TECHNICAL FIELD

Implementations of the present disclosure relate to the communication field, and more particularly to methods for wireless communication and devices.

BACKGROUND

In Release 16, secondary authentication is introduced for network slices, namely network slice-specific authentication and authorization (NSSAA). Specifically, when user equipment (UE) needs to register with a network slice, a third-party network element needs to authenticate the terminal device. This feature is an optional parameter in an R16 fifth generation (5G) system, that is, the UE may or may not support the NSSAA. The UE indicates to a network whether the UE supports or does not support the NSSAA through an indication in a 5G system mobility management (5GMM) capability parameter in a registration request.

If the UE does not support the NSSAA, the network does not trigger an NSSAA procedure.

However, if a network slice requested by the UE is subject to the NSSAA, the network determines that the network slice cannot be used by the UE. Accordingly, the network puts a network slice selection assistance information (NSSAI) of the network slice into a rejected NSSAI (rejected single-network slice selection assistance information (S-NSSAI)) and sends the rejected NSSAI to the UE, where each rejected S-NSSAI carries a rejected cause. The rejected cause may be that the S-NSSAI is not available on a current public land mobile network (PLMN) or a stand-alone non-public network (SNPN).

In a roaming scenario, when the UE needs to register with a network slice of a visited public land mobile network (VPLMN) and a home public land mobile network (HPLMN), the UE can make a registration request message carry a requested NSSAI, where the requested NSSAI includes one or more S-NSSAIs of the VPLMN and one or more S-NSSAIs of the HPLMN. If the UE does not support the NSSAA, the network can put the S-NSSAI of the VPLMN into the rejected NSSAI (rejected S-NSSAI) and send the rejected NSSAI to the UE, that is, the rejected S-NSSAI includes the VPLMN S-NSSAI.

However, in actual deployment, one VPLMN S-NSSAI may correspond to multiple HPLMN S-NSSAIs. Only some of the multiple HPLMN S-NSSAIs may require the NSSAA. Therefore, if the network puts the VPLMN S-NSSAI into the rejected S-NSSAI, it is equivalent to prohibiting the UE from using remaining HPLMN S-NSSAIs that does not require the NSSAA. Accordingly, the problem of overkilled may occur.

Therefore, there is an urgent need in the art for a method and device that can improve an efficiency and/or a success rate of registering with a network slice.

SUMMARY

Methods for wireless communication and devices are provided.

According to a first aspect, a method for wireless communication is provided. The method is applied to a terminal device not supporting NSSAA. The method includes: receiving, by a terminal device, a first message sent by an access and mobility management function (AMF), where the first message contains no first S-NSSAI of VPLMN, a second S-NSSAI is subject to the NSSAA, and the second S-NSSAI is an S-NSSAI of HPLMN corresponding to the first S-NSSAI; and sending, by the terminal device, a second message to the AMF, where the second message is used for requesting for registering with a network slice.

According to a second aspect, a method for wireless communication is provided. The method includes: sending, by an AMF, a first message to a terminal device, where the first message contains no first S-NSSAI of VPLMN, a second S-NSSAI is subject to the NSSAA, and the second S-NSSAI is an S-NSSAI of HPLMN corresponding to the first S-NSSAI; and receiving, by the AMF, a second message sent by the terminal device, where the second message is used for requesting for registering with a network slice.

According to a third aspect, a terminal device is provided. The terminal device includes a transceiver, a processor, and a memory storing a computer program. The computer program is executed by the processor to cause the transceiver to: receive a first message sent by an AMF, where the first message contains no first S-NSSAI of VPLMN, a second S-NSSAI is subject to the NSSAA, and the second S-NSSAI is an S-NSSAI of HPLMN corresponding to the first S-NSSAI; and send a second message to the AMF, where the second message is used for requesting for registering with a network slice.

According to a fourth aspect, a core network device is provided. The core network device includes a transceiver, a processor, and a memory storing a computer program. The computer program is executed by the processor to cause the transceiver to: send a first message to a terminal device, where the first message contains no first S-NSSAI of VPLMN, a second S-NSSAI is subject to NSSAA, and the second S-NSSAI is an S-NSSAI of HPLMN corresponding to the first S-NSSAI; and receive a second message sent by the terminal device, where the second message is used for requesting for registering with a network slice.

DETAILED DESCRIPTION

The technical solutions in the present disclosure will be described in the following with reference to the accompanying drawings.

Figure 1:
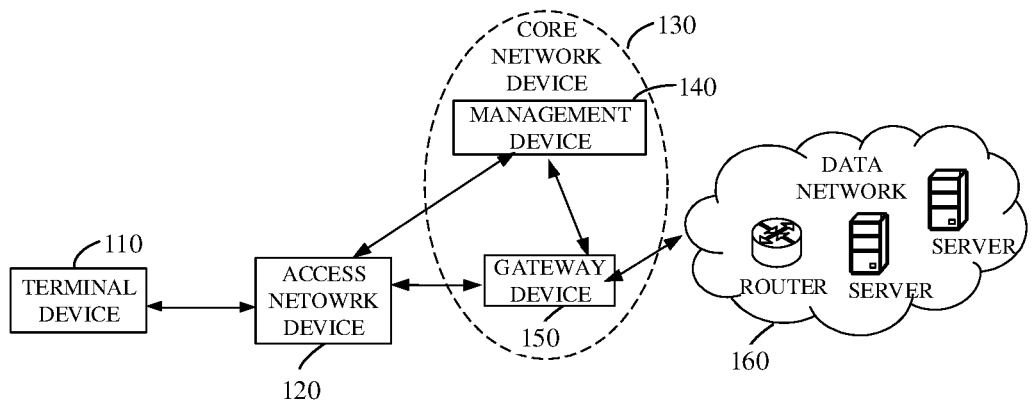
FIG. 1 and FIG. 2 illustrate examples of a system architecture provided in implementations of the present disclosure

FIG. 1 is a schematic block diagram illustrating a wireless communication system architecture 100 provided in the present disclosure.

As illustrated in FIG. 1, the system architecture 100 includes a terminal device 110, an access network device 120, a core network device 130, and a data network (DN) 160. The core network device 130 includes a management device 140 and a gateway device 150.

In some implementations of the present disclosure, optionally, the terminal device 110 may be connected through a wireless air interface to the access network device 120 deployed by an operator, and then connected to the data network 160 through the core network device 130. The terminal device 110 may also be referred to as user equipment (UE).

For example, the terminal device 110 includes but is not limited to a mobile phone, a computer, and may also be a cellular phone, a cordless phone, a session initiation protocol (SIP) phone, a smart phone, a wireless local loop (WLL) station, a personal digital assistant (PDA), a computer, a laptop computer, a handheld communication device, a handheld computing device, a satellite wireless device, a wireless modem card, a set top box (STB), user premise equipment (CPE) and/or other devices communicating over a wireless system.

In some implementations of the present disclosure, optionally, the access network device 120 may also be referred to as an access network (AN)/radio access network (RAN) device. The access network device 120 is mainly used to implement functions such as radio physical layer functions, resource scheduling and radio resource management, radio access control, and mobility management. The access network device 120 may also be referred to as a fifth generation-AN (5G-AN)/5G-RAN node.

For example, the access network device 120 includes but is not limited to: an access point (AP), a next-generation NodeB (NR NodeB, gNB), a gNB with a central unit (CU) and distributed units (DUs) in a separate form, a transmission reception point (TRP), a transmission point (TP) or some other access nodes.

In some implementations of the present disclosure, optionally, the core network device 130 is mainly used to implement functions such as call connection, charging, mobility management, and implementation of supplementary services.

For example, the core network device 130 may include the management device 140 and the gateway device 150. The access network device 120 can communicate with both the management device 140 and the gateway device 150. The gateway device 150 can communicate with the data network 160. The management device 140 is mainly used for device registration, security authentication, mobility management, and location management of the terminal device. The gateway device 150 is mainly used to establish a channel with the terminal device, and forward on the channel data packets between the terminal device and an external data network.

In some implementations of the present disclosure, optionally, the data network 160 may correspond to different service domains, such as internet protocol (IP) multimedia subsystem (IMS), Internet, Internet protocol television (IPTV), other operators' service domains, etc., and is mainly used to provide a variety of data business services for the terminal device.

For example, the data network 160 may include a network device such as a server (including a server providing multicast services), a router, and a gateway.

It is to be noted that FIG. 1 only illustrates an exemplary architecture diagram, and should not be construed as a limitation on the architecture.

For example, in addition to the function units illustrated in FIG. 1, the system architecture 100 may further include other function units or function entities.

Figure 2:
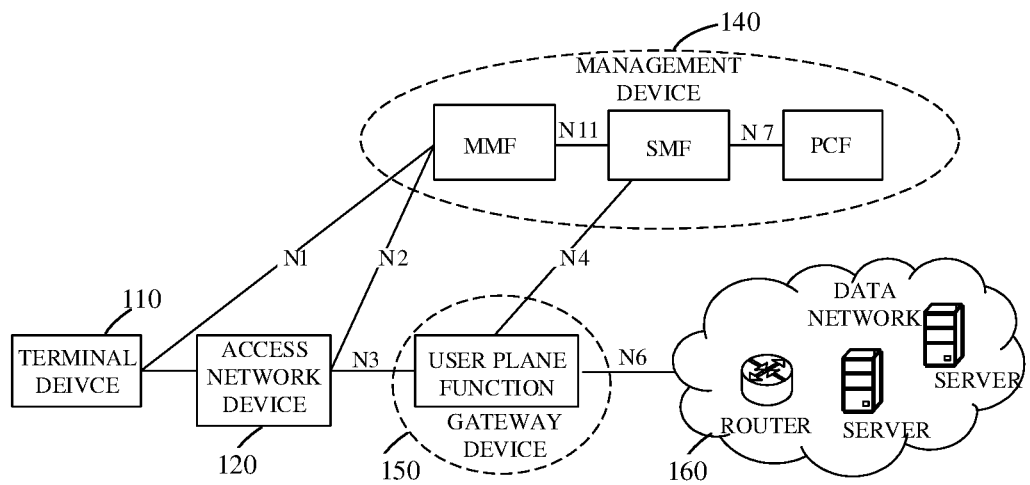

FIG. 2 illustrates an example of the system architecture illustrated in FIG. 1.

As illustrated in FIG. 2, the management device 140 may include an access and mobility management function (AMF), a session management function (SMF), a policy control function (PCF) and other function units. The gateway device 150 may include function units such as a user plane function (UPF), and these function units may work independently, or may be combined together to implement certain control functions.

In other words, the AMF, the SMF, and the PCF can be combined as a management device to complete access control and mobility management functions of the terminal device such as access authentication, security encryption, and location registration, as well as session management functions such as establishment, release, and change of user plane transmission paths, and functions such as analyzing some slice-related data (such as congestion) and data related to the terminal device. As a gateway device, the UPF mainly performs functions such as routing and forwarding of user plane data, for example, the UPF is responsible for data packet filtering, data transmission/forwarding, rate control, and generation of charging information for the terminal device.

As illustrated in FIG. 2, the terminal device 110 can establish a control plane signaling connection with the AMF through an NG interface 1 (NG1, N1); the access network device 120 can establish a control plane signaling connection with the AMF through an NG interface 2 (NG2, N2); the access network device 120 can establish a user plane data connection with the UPF through an NG interface 3 (NG3, N3); the UPF can establish a control plane signaling connection with the SMF through an NG interface 4 (NG4, N4); and the UPF can exchange user plane data with the data network through an NG interface 6 (NG6, N6).

Of course, FIG. 2 only illustrates an example of the present disclosure, and should not be construed as a limitation on the present disclosure.

For example, the terminal device 110 can establish an air interface connection with the access network device 120 through a new radio (NR) interface, to send user plane data and control plane signaling. The AMF can establish control plane signaling connection with the SMF through an NG interface 11 (NG11, N11). The SMF can establish a control plane signaling connection with the PCF through an NG interface 7 (NG7, N7).

It is to be noted that the system architecture 100 in implementations of the present disclosure can support a protocol data unit (PDU) connection service, and the PDU connection service refers to a service of exchanging PDU data packets between the UE and the DN.

For example, a service of exchanging PDU data packets between the terminal device 110 and the data network 160 is illustrated. The terminal device initiates establishment of a PDU session to realize a PDU session connection. After a single PDU session is established, a data transmission channel between the terminal device 110 and the data network 160 is established. In other words, the PDU session refers to a communication process between the terminal device 110 and the data network 160.

In addition, the terminal device 110 may establish multiple PDU session connections, and SMFs corresponding to the PDU sessions may be different or the same. For example, the terminal device 110 may be connected to a same data network through different UPFs. In other words, a PDU session can have multiple N6 interfaces at the same time. The UPF connecting each N6 interface is called a PDU session anchor, and PDU session anchors provide different paths to the same data network. The terminal device 110 may establish multiple PDU sessions, and each of the PDU sessions may include multiple data radio bearers (DRBs) at the RAN side.

In some implementations of the present disclosure, optionally, a PDU data packet may include at least one of: number, international mobile subscriber identity (IMSI), international mobile equipment identity (MEI), PDU session identifier (ID), session type (internet protocol version 4 (IPv4), internet protocol version 6 (IPv6), internet protocol version 4 and version 6 (IPv4v6), and Ethernet frame), uplink and downlink rate, charging ID, roaming status information, IP information of the terminal device, PCF equipment information, quality of service (QoS) information, tunnel information, destination address, SMF ID, slice information (if support), default DRB information, data network name, AMF information, user location information, session management information, UPF ID, online charging ID, offline charging ID, and other related information.

It is to be noted that, before the terminal device 110 sends data, the terminal device 110 needs to access a network slice. In other words, a user plane connection between the terminal device 110 and the data network 160 can be established through a network slice. For example, after the access network device 120 selects an AMF capable of supporting a required network slice, one or more PDU sessions connected to the data network 160 can be established through the network slice. Optionally, different network slices have different single-network slice selection assistance information (S-NSSAI). In other words, the S-NSSAI can be used to identify the network slice.

Each PDU session can have multiple QoS flows, and thus data communication belonging to different network slices and different transmission performance requirements (such as reliability, transmission delay, transmission rate, etc.) can be carried by different PDU sessions. For example, the network can make enhanced mobile broadband (eMBB) and ultra-reliable and low latency communication (URLLC) services be carried on different PDU sessions, respectively.

For example, in a downlink direction, a non-access stratum (NAS) service data flow (SDF) template of the core network device 130 classifies different data packets from an application layer and maps classified data packets to different QoS flows in different PDU sessions, and sends the QoS flows in different PDU sessions to the access network device 120. The access network device 120 maps the QoS flows to different DRBs according to IDs of the QoS flows, and sends the QoS flows to the UE through the air interface. Similarly, for uplink data, a similar operation can also be used.

Figure 3:
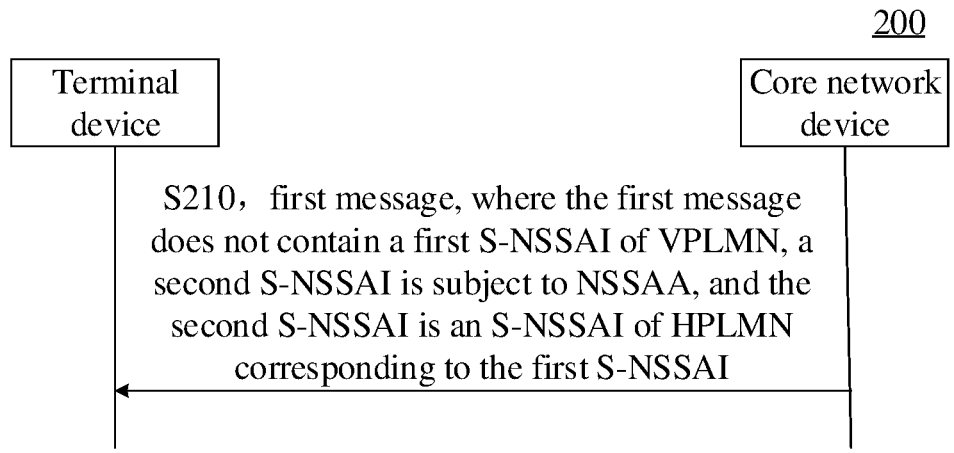
FIG. 3 is a schematic flow chart illustrating a method for wireless communication provided in implementations of the present disclosure.

FIG. 3 is a schematic flow chart illustrating a method 200 for wireless communication according to implementations of the present disclosure. The method 200 can be interactively executed by a terminal device and a core network device. The terminal device illustrated in FIG. 3 may be the terminal device illustrated in FIG. 1, and the core network device illustrated in FIG. 3 may be the core network device illustrated in FIG. 1. Optionally, the core network device may be a device with an AMF. Optionally, the method 200 may be applied to a terminal device that does not support NSSAA. In other words, the terminal device may be a device that does not support the NSSAA.

As illustrated in FIG. 3, the method 200 includes some or all of the following contents.

At S210, the terminal device receives a first message sent by the AMF.

The first message does not contain a first S-NSSAI of visited public land mobile network (VPLMN), a second S-NSSAI is subject to the NSSAA, and the second S-NSSAI is an S-NSSAI of home public land mobile network (HPLMN) corresponding to the first S-NSSAI.

Specifically, in the case of that the terminal device needs to access a network slice identified by the first S-NSSAI of the VPLMN and a network slice identified by the second S-NSSAI of the HPLMN, if the terminal device does not support the NSSAA, and the second S-NSSAI is subject to the NSSAA, the first message received by the terminal device does not contain the first S-NSSAI, for example, is a registration reject message.

In other words, in the case of that the terminal device needs to access the network slice identified by the first S-NSSAI of the VPLMN and the network slice identified by the second S-NSSAI of the HPLMN, if the terminal device does not support the NSSAA, and the second S-NSSAI is subject to the NSSAA, the first message sent by the AMF to the terminal device does not contain the first S-NSSAI, for example, is the registration reject message.

According to that the first message does not contain the first S-NSSAI of the VPLMN, on the one hand, since the first S-NSSAI is not used as an S-NSSAI in an allowed NSSAI, the terminal device does not use the network slice identified by the first S-NSSAI to establish a session, which can prevent the terminal device from establishing a session using the network slice identified by the first S-NSSAI and the network slice identified by the second S-NSSAI. On the other hand, since the first S-NSSAI is not used as an S-NASSAI in a rejected NSSAI, which can achieve that the terminal device is not prevented from re-requesting the network slice identified by the first S-NSSAI. Correspondingly, the usage of a VPLMN S-NSSAI and other HPLMN S-NSSAIs without needing the NSSAA can be ensured in registration with a network slice, thereby improving an efficiency and/or a success rate of registering with the network slice.

It can be understood that in implementations of the present disclosure there is no limitation on a specific format of the S-NSSAI.

Exemplarily, the following will illustrate the format of the S-NSSAI in conjunction with Table 1.

TABLE 1

| S-NSSAI Information Element | | | | | | | | |
|---|---|---|---|---|---|---|---|---|
| 8 | 7 | 6 | 5 | 4 | 3 | 2 | 1 | |
| S-NSSAI IEI | | | | | | | | Octet 1 |
| Length of S-NSSAI contents | | | | | | | | Octet 2 |
| SST | | | | | | | | Octet 3 |
| SD | | | | | | | | Octet 4* |
| | | | | | | | | Octet 6* |

TABLE 1-continued

S-NSSAI Information Element

| 8 | 7 | 6 | 5 | 4 | 3 | 2 | 1 | |
|---|---|---|---|---|---|---|---|---|
| | | Mapped HPLMN SST | | | | | | Octet 7* |
| | | Mapped HPLMN SD | | | | | | Octet 8* |
| | | | | | | | | Octet 10* |

As illustrated in Table 1, the S-NSSAI may include 10 octets, each octet may include 8 bits, and the octet may also be referred to as a byte. Octet 1 is used for S-NSSAI information element indication (IEI); octet 2 is used to indicate a length of S-NSSAI contents; octet 3 is used for slice/service type (SST), where the SST is used to represent expected network slice behavior in terms of functions and services; octet 4 to octet 6 (i.e., 24 bits) are used for a slice differentiator (SD), where the SD may be optional information, and the SD can be used to supplement the SST to distinguish multiple network slices of same SST; octet 7 is used for mapped HPLMN SST; and octet 8 to octet 10 are used for a mapped HPLMN SD.

In some implementations of the present disclosure, the first message does not contain an allowed NSSAI and a rejected NSSAI.

In other words, the first message received by the terminal device neither contains the allowed NSSAI nor the rejected NSSAI. For example, the first message may include an indication used to indicate rejection of registration of the terminal device.

It is to be understood that in implementations of the present disclosure, the allowed NSSAI can be used to represent an S-NSSAI allowed by the core network device. Optionally, the allowed NSSAI may be an NSSAI requested by the terminal device, or, if the terminal device requests no S-NSSAI, the allowed NSSAI may be a contracted S-NSSAI for the terminal device. Correspondingly, the core network device can indicate to the terminal device the allowed NSSAI in the first message. For example, the allowed NSSAI may be information in a registration accept message. Similarly, the rejected NSSAI can be used to represent an S-NSSAI rejected by the core network device. Optionally, the rejected NSSAI may be an NSSAI requested by the terminal device, or, if the terminal device requests no NSSAI, the rejected NSSAI may be a contracted S-NSSAI for the terminal device. Correspondingly, the core network device may indicate to the terminal device the rejected NSSAI in the first message. For example, the first message may be a registration reject message. It may also be understood that the allowed NSSAI or the rejected NSSAI may be a collection of S-NSSAIs. In other words, the allowed NSSAI or the rejected NSSAI may include one or more S-NSSAIs. Alternatively, in other words, the allowed NSSAI or the rejected NSSAI may be an S-NSSAI list.

A condition that the first message does not contain the allowed NSSAI and the rejected NSSAI is applicable for that all second S-NSSAIs contained in a requested NSSAI are subject to the NSSAA, or all contracted S-NSSAIs are subject to the NSSAA if no NSSAI is requested.

In some implementations of the present disclosure, the first message contains the allowed NSSAI and/or the rejected NSSAI. If the first message contains the allowed NSSAI, the allowed NSSAI does not include the first S-NSSAI. If the first message contains the rejected NSSAI, the rejected NSSAI does not include the first S-NSSAI.

For example, the first message contains the allowed NSSAI, and the allowed NSSAI does not include the first S-NSSAI. For another example, the first message contains the rejected NSSAI, and the rejected NSSAI does not include the first S-NSSAI. For yet another example, the first message contains the allowed NSSAI and the rejected NSSAI, the allowed NSSAI does not include the first S-NSSAI, and the rejected NSSAI does not include the first S-NSSAI.

In other words, the core network device can determine whether the second S-NSSAI is subject to the NSSAA based on that the terminal device does not support the NSSAA. If the second S-NSSAI is subject to the NSSAA, the core network device can determine that the second S-NSSAI cannot be used by the terminal device, and at the same time, does not determine the first S-NSSAI as an S-NSSAI in the rejected NSSAI, and also does not determine the first S-NSSAI as an S-NSSAI in the allowed NSSAI.

On the one hand, since the first S-NSSAI is not used as the S-NSSAI in the allowed NSSAI, the terminal device does not use the network slice identified by the first S-NSSAI to establish a session, which can prevent the terminal device from establishing a session using the network slice identified by the first S-NSSAI and the network slice identified by the second S-NSSAI. On the other hand, the first S-NSSAI is not regarded as the S-NSSAI in the rejected NSSAI, and thus the terminal device is not prevented from re-requesting the network slice identified by the first S-NSSAI. Correspondingly, the usage of a VPLMN S-NSSAI and other HPLMN S-NSSAIs without needing the NSSAA can be ensured in registration with a network slice, thereby improving an efficiency and/or a success rate of registering with a network slice.

For example, according to that the first S-NSSAI previously requested is neither an S-NSSAI in the allowed NSSAI nor an S-NSSAI in the rejected NSSAI, if the terminal device still needs to request the first S-NSSAI in next registration, the terminal device can avoid carrying the second S-NSSAI, and attempt to request an S-NSSAI of the HPLMN corresponding to the first S-NSSAI and except for the second S-NSSAI.

In some implementations of the present disclosure, the first message contains the rejected NSSAI and/or a rejected mapped NSSAI. If the first message contains the rejected NSSAI, the rejected NSSAI includes the second S-NSSAI. If the first message contains the rejected mapped NSSAI, the rejected mapped NSSAI includes the second S-NSSAI.

For example, the first message contains the rejected NSSAI, and the rejected NSSAI includes the second S-NSSAI. For another example, the first message includes the rejected mapped NSSAI, and the rejected mapped NSSAI includes the second S-NSSAI. For yet another example, the first message contains the rejected NSSAI and the rejected mapped NSSAI, the rejected NSSAI includes the second S-NSSAI, and the rejected mapped NSSAI includes the second S-NSSAI.

In other words, the core network device can regard the second S-NSSAI as an S-NSSAI in the rejected mapped NSSAI or an S-NSSAI in the rejected NSSAI. Optionally, the rejected NSSAI may further carry or include the first S-NSSAI.

Based on the above, the terminal device can determine that the second S-NSSAI of the HPLMN is unavailable according to the rejected NSSAI and/or the rejected mapped NSSAI. In next registration, if the terminal device still needs to request the first S-NSSAI of the VPLMN, the terminal device can avoid carrying the second S-NSSAI, and attempt to request the S-NSSAI of the HPLMN corresponding to the first S-NSSAI and except for the second S-NSSAI.

In some implementations of the present disclosure, the method 200 may further include the following.

The terminal device sends a second message to the AMF, where the second message is used to request for registering with a network slice.

As an example, the second message contains a first requested NSSAI, and the first requested NSSAI includes the first S-NSSAI and at least one S-NSSAI of the HPLMN corresponding to the first S-NSSAI, where the at least one S-NSSAI includes the second S-NSSAI. For example, the first requested NSSAI includes only the first S-NSSAI and the second S-NSSAI.

As another example, the second message contains no requested NSSAI. For example, when the terminal device requests no NSSAI, a contracted S-NSSAI for the terminal device can be regarded as an S-NSSAI requested by the terminal device.

In other words, after sending the second message to the AMF, the terminal device receives the first message sent by the AMF. The first S-NSSAI and the second S-NSSAI may be NSSAIs carried in a registration request message from the terminal device, where the second message may also contain no requested NSSAI.

In some implementations of the present disclosure, the second message is a registration request message, and/or the first message is a registration accept message or a registration reject message.

Figure 4:
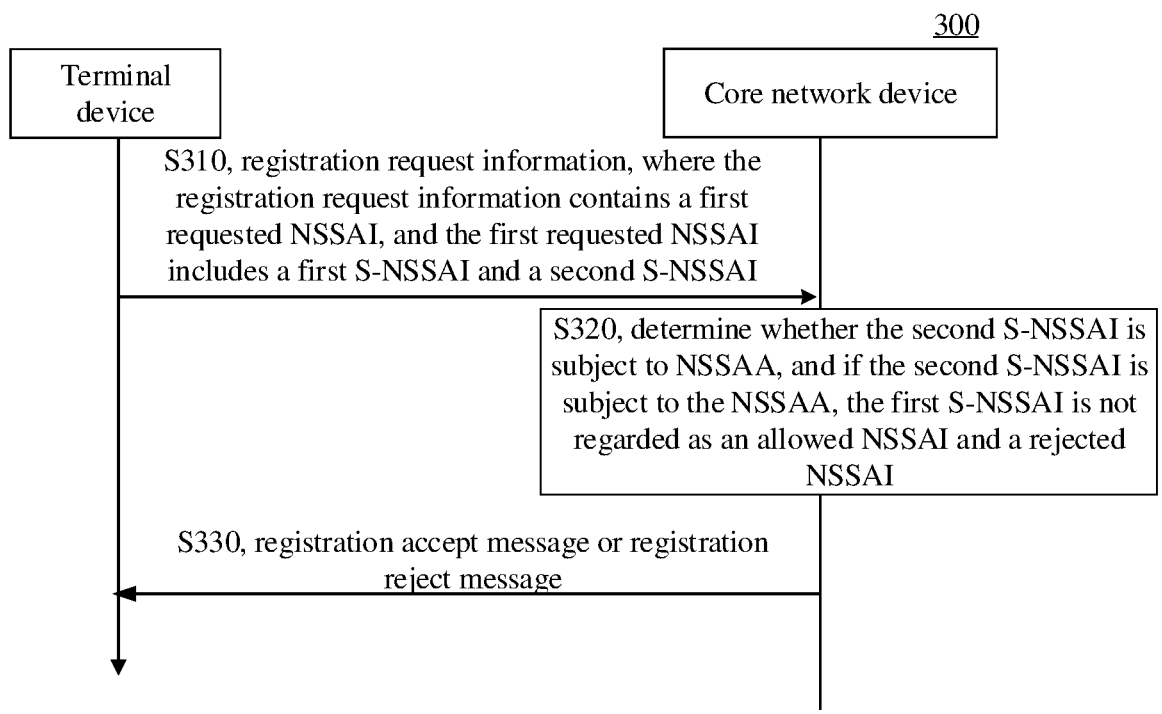
FIG. 4 is another schematic flow chart illustrating a method for wireless communication provided in implementations of the present disclosure.
Figure 5:
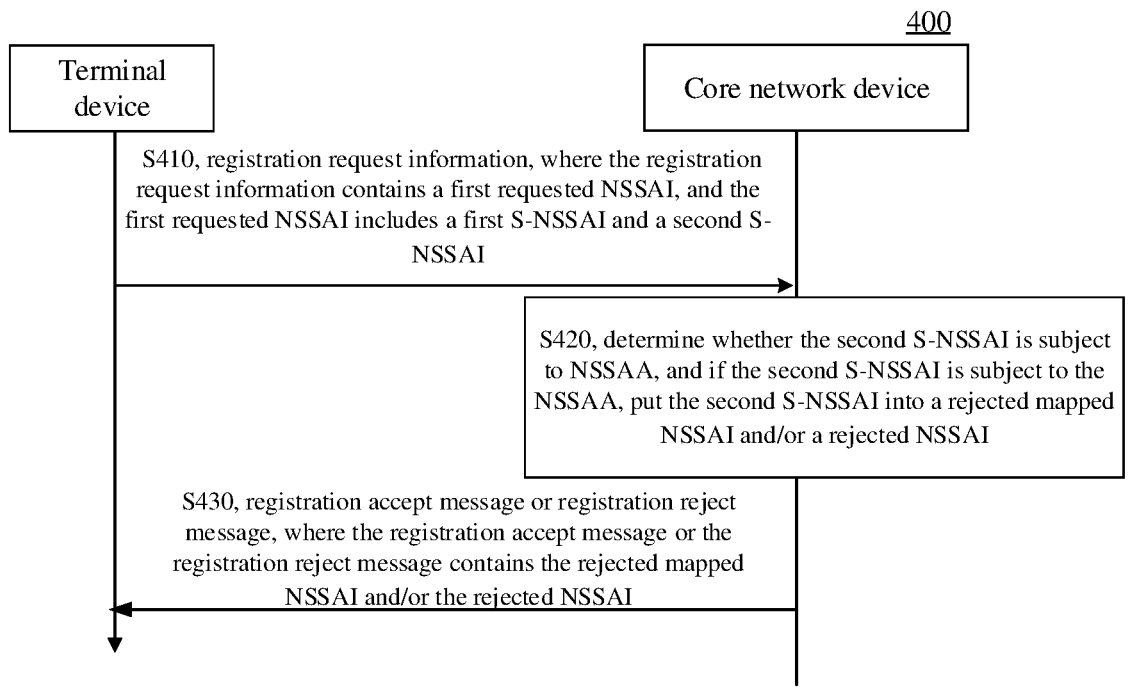
FIG. 5 is a yet another schematic flow chart illustrating a method for wireless communication provided in implementations of the present disclosure.

In conjunction with FIG. 4 and FIG. 5, the following will take that the second message contains the first NSSAI as example to illustrate the solution of the present disclosure.

FIG. 4 is a schematic flow chart illustrating a method 300 for wireless communication provided in implementations of the present disclosure.

As illustrated in FIG. 4, the method 300 may include the following.

At S310, registration request information, where the registration request information contains a first requested NSSAI, and the first requested NSSAI includes a first S-NSSAI and a second S-NSSAI.

At S320, determine whether the second S-NSSAI is subject to NSSAA, and if the second S-NSSAI is subject to the NSSAA, the first S-NSSAI is not regarded as an allowed NSSAI and a rejected NSSAI.

At S330, a registration accept message or a registration reject message.

FIG. 5 is a schematic flow chart illustrating a method 400 for wireless communication provided in implementations of the present disclosure.

As illustrated in FIG. 5, the method 400 may include the following.

At S410, registration request information, where the registration request information contains a first requested NSSAI, where the first requested NSSAI includes a first S-NSSAI and a second S-NSSAI.

At S420, determine whether the second S-NSSAI is subject to NSSAA, and if the second S-NSSAI is subject to the NSSAA, put the second S-NSSAI into a rejected mapped NSSAI and/or a rejected NSSAI.

At S430, a registration accept message or a registration reject message, where the registration accept message or the registration reject message contains the rejected mapped NSSAI and/or the rejected NSSAI.

In some implementations of the present disclosure, all S-NSSAIs of the HPLMN requested by the second message are subject to the NSSAA, or the second message contains no requested NSSAI and a contracted S-NSSAI is subject to the NSSAA. The first message may also include at least one of: information used to indicate rejection of registration of the terminal device; information used to indicate the terminal device to re-initiate registration; or information used to indicate a cause for rejection of registration of the terminal device or a cause for indicating the terminal device to re-initiate registration.

For example, all the S-NSSAIs of the HPLMN requested by the second message are subject to the NSSAA. The first message may further include at least one of: information used to indicate rejection of registration of the terminal device; information used to indicate the terminal device to re-initiate registration; or information used to indicate a cause for rejection of registration of the terminal device or a cause for indicating the terminal device to re-initiate registration.

For another example, the second message contains no requested NSSAI and a contracted S-NSSAI is subject to the NSSAA. The first message may further include at least one of: information used to indicate rejection of registration of the terminal device; information used to indicate the terminal device to re-initiate registration; and information used to indicate a cause for rejection of registration of the terminal device or a cause for indicating the terminal device to re-initiate registration.

Exemplarily, the information used to indicate the cause for rejection of the registration of the terminal device or the cause for indicating the terminal device to re-initiate registration may be that an S-NSSAI is unavailable due to failed or revoked NSSAA.

In some implementations of the present disclosure, the method 200 may further include sending, by the terminal device, a third message to the AMF.

The third message contains a second requested NSSAI, where the second requested NSSAI includes the first S-NSSAI and a third S-NSSAI, the third S-NSSAI is an S-NSSAI of the HPLMN corresponding to the first S-NSSAI, and the third S-NSSAI is different from the second S-NSSAI.

For example, the terminal device sends the third message to the AMF when at least one of the following conditions is satisfied: the first message does not contain an allowed NSSAI and a rejected NSSAI; the first message contains the allowed NSSAI and/or the rejected NSSAI, where if the first message contains the allowed NSSAI, the allowed NSSAI does not include the first S-NSSAI, and if the first message contains the rejected NSSAI, the rejected NSSAI does not include the first S-NSSAI; or the first message contains the rejected NSSAI and/or a rejected mapped NSSAI, where if the first message contains the rejected NSSAI, the rejected NSSAI includes the at least one S-NSSAI, and if the first message contains the rejected mapped NSSAI, the rejected mapped NSSAI includes the at least one S-NSSAI. The first message may also include at least one of: information used to indicate rejection of registration of the terminal device; information used to indicate the terminal device to re-initiate registration; or information used to indicate a cause for rejection of registration of the terminal device or a cause for indicating the terminal device to re-initiate registration.

In other words, if all S-NSSAIs of the HPLMN in the first requested NSSAI cannot be used by the terminal device, the terminal device can use the third S-NSSAI corresponding to the first S-NSSAI to re-initiate a registration request.

In some implementations of the present disclosure, the third S-NSSAI is not subject to the NSSAA.

In other words, for the third S-NSSAI, it is not necessary to perform the NSSAA for the terminal device, which is equivalent to that a network slice identified by the third S-NSSAI and requested by the terminal device can be used by the terminal device, correspondingly, the AMF can regard the third S-NSSAI as an S-NSSAI in the allowed NSSAI and send the third S-NSSAI to the terminal device.

In some implementations of the present disclosure, the second S-NSSAI or a fourth S-NSSAI is a contracted S-NSSAI, the fourth S-NSSAI is an S-NSSAI of the HPLMN corresponding to the first S-NSSAI, and the fourth S-NSSAI is different from the second S-NSSAI. Optionally, the fourth S-NSSAI and the third S-NSSAI may be the same S-NSSAI, or may be different S-NSSAIs.

For example, the second S-NSSAI is a contracted S-NSSAI. Even if the second message from the terminal device does not carry the second S-NSSAI, the AMF can use a default manner to determine the second S-NSSAI to be an S-NSSAI of a network slice that the terminal device needs to register with.

For another example, the fourth S-NSSAI and the third S-NSSAI are the same S-NSSAI, which is equivalent to that after the terminal device fails to register with the network slice identified by the second S-NSSAI, the terminal device can request for registering with a network slice identified by the fourth S-NSSAI corresponding to the first S-NSSAI.

It is to be understood that in the implementations of the present disclosure, registration with the network slice can also be understood as access to the network slice, which is not specifically limited in the implementations of the present disclosure.

The implementations of the present disclosure are described above in detail with reference to the accompanying drawings. However, the present disclosure is not limited to specific details in the above-mentioned implementations. Within the scope of the technical idea of the present disclosure, there may be a variety of simple variants of the technical solutions of the present disclosure, and all the simple variants fall within the scope of protection of the present disclosure.

For example, various specific technical features described in the above-mentioned specific implementations can be combined in any suitable manner if there is no contradiction. In order to avoid unnecessary repetition, in the present disclosure various possible combinations will not be further illustrated.

For another example, various implementations of the present disclosure can also be combined in any manner, as long as the idea of the present disclosure is not violated, and the combination shall also be regarded as the content disclosed in the present disclosure.

It is to be understood that in the various method implementations of the present disclosure, the sequence numbers of the above-mentioned processes do not imply the order of execution, and the order of execution of the processes should be determined by functions and internal logic of the processes, and does not construct any limitation on the implementation process of the implementations of the present disclosure.

The method implementations of the present disclosure are described in detail above in conjunction with FIGS. 3 to 5, and device implementations of the present disclosure will be described in detail below in conjunction with FIGS. 6 to 9.

Figure 6:
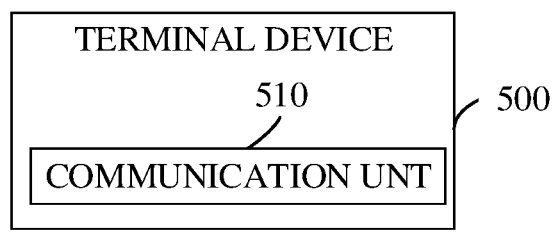
FIG. 6 is a schematic block diagram illustrating a terminal device provided in implementations of the disclosure.

FIG. 6 is a schematic block diagram illustrating a terminal device 500 according to implementations of the present disclosure. The terminal device 500 does not support NSSAA.

Referring to FIG. 6, the terminal device 500 includes a communication unit 510 configured to receive a first message sent by an AMF, where the first message contains no first S-NSSAI of VPLMN, a second S-NSSAI is subject to the NSSAA, and the second S-NSSAI is an S-NSSAI of HPLMN corresponding to the first S-NSSAI.

In some implementations of the present disclosure, the first message contains no allowed NSSAI and no rejected NSSAI.

In some implementations of the present disclosure, the first message contains an allowed NSSAI and/or a rejected NSSAI, where on condition that the first message contains the allowed NSSAI, the allowed NSSAI does not include the first S-NSSAI, and on condition that the first message contains the rejected NSSAI, the rejected NSSAI does not include the first S-NSSAI.

In some implementations of the present disclosure, the first message contains a rejected NSSAI and/or a rejected mapped NSSAI, where on condition that the first message contains the rejected NSSAI, the rejected NSSAI includes the second S-NSSAI, and on condition that the first message contains the rejected mapped NSSAI, the rejected mapped NSSAI includes the second S-NSSAI.

In some implementations of the present disclosure, the communication unit 510 is further configured to send a second message to the AMF, where the second message is used for requesting for registering with a network slice.

In some implementations of the present disclosure, the second message contains a first requested NSSAI, the first requested NSSAI includes the first S-NSSAI and at least one S-NSSAI of the HPLMN corresponding to the first S-NSSAI, and the at least one S-NSSAI includes the second S-NSSAI.

In some implementations of the present disclosure, the second message contains no requested NSSAI.

In some implementations of the present disclosure, all S-NSSAIs of the HPLMN requested by the second message are subject to the NSSAI, or the second message contains no requested NSSAI and a contracted S-NSSAI is subject to the NSSAA, where the first message further includes at least one of: information used to indicate rejection of registration of the terminal device; information used to indicate the terminal device to re-initiate registration; or information used to indicate a cause for rejection of registration of the terminal device or a cause for indicating the terminal device to re-initiate registration.

In some implementations of the present disclosure, the second message is a registration request message.

In some implementations of the present disclosure, the communication unit 510 is further configured to send a third message to the AMF, where the third message contains a second requested NSSAI, the second requested NSSAI includes the first S-NSSAI and a third S-NSSAI, the third S-NSSAI is an S-NSSAI of the HPLMN corresponding to the first S-NSSAI, and the third S-NSSAI is different from the second S-NSSAI.

In some implementations of the present disclosure, the third S-NSSAI is not subject to the NSSAA.

In some implementations of the present disclosure, the second S-NSSAI or a fourth S-NSSAI is a contracted S-NSSAI, the fourth S-NSSAI is an S-NSSAI of the HPLMN corresponding to the first S-NSSAI, and the fourth S-NSSAI is different from the second S-NSSAI.

In some implementations of the present disclosure, the first message is a registration accept message or a registration reject message.

It is to be understood that the device implementations and the method implementations may correspond to each other, and for similar illustrations, reference may be made to the method implementations. Specifically, the terminal device 500 illustrated in FIG. 6 may correspond to the corresponding subjects for performing the methods 200 to 400 in implementations of the present disclosure, and the aforementioned and other operations and/or functions of the respective units in the terminal device 500 are respectively for realizing the corresponding processes in the methods in FIG. 3 to FIG. 5, which will not be repeated here for the sake of brevity.

Figure 7:
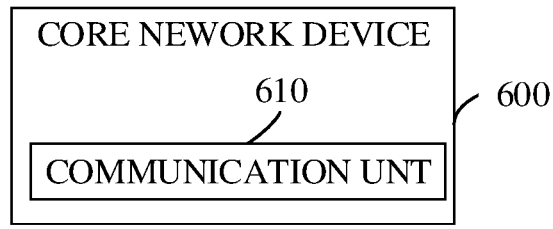
FIG. 7 is a schematic block diagram illustrating a core network device provided in implementations of the disclosure.

FIG. 7 is a schematic block diagram illustrating a core network device 600 provided in implementations of the present disclosure. Optionally, the core network device 600 may have an AMF.

As illustrated in FIG. 7, the core network device 600 includes a communication unit 610 configured to send a first message to a terminal device, where the first message contains no first S-NSSAI of VPLMN, a second S-NSSAI is subject to NSSAA, and the second S-NSSAI is an S-NSSAI of HPLMN corresponding to the first S-NSSAI.

In some implementations of the present disclosure, the first message contains no allowed NSSAI and no rejected NSSAI.

In some implementations of the present disclosure, the first message contains an allowed NSSAI and/or a rejected NSSAI, where on condition that the first message contains the allowed NSSAI, the allowed NSSAI does not include the first S-NSSAI, and on condition that the first message contains the rejected NSSAI, the rejected NSSAI does not include the first S-NSSAI.

In some implementations of the present disclosure, the first message contains a rejected NSSAI and/or a rejected mapped NSSAI, where on condition that the first message contains the rejected NSSAI, the rejected NSSAI includes the second S-NSSAI, and on condition that the first message contains the rejected mapped NSSAI, the rejected mapped NSSAI includes the second S-NSSAI.

In some implementations of the present disclosure, the communication unit 610 is further configured to receive a second message sent by the terminal device, where the second message is used for requesting for registering with a network slice.

In some implementations of the present disclosure, the second message contains a first requested NSSAI, the first requested NSSAI includes the first S-NSSAI and at least one S-NSSAI of the HPLMN corresponding to the first S-NSSAI, and the at least one S-NSSAI includes the second S-NSSAI.

In some implementations of the present disclosure, the second message contains no requested NSSAI.

In some implementations of the present disclosure, all S-NSSAIs of the HPLMN requested by the second message are subject to the NSSAI, or the second message contains no requested NSSAI and a contracted S-NSSAI is subject to the NSSAA, where the first message further includes at least one of: information used to indicate rejection of registration of the terminal device; information used to indicate the terminal device to re-initiate registration; or information used to indicate a cause for rejection of registration of the terminal device or a cause for indicating the terminal device to re-initiate registration.

In some implementations of the present disclosure, the second message is a registration request message.

In some implementations of the present disclosure, the communication unit 610 is further configured to receive a third message sent by the terminal device, where the third message contains a second requested NSSAI, the second requested NSSAI includes the first S-NSSAI and a third S-NSSAI, the third S-NSSAI is an S-NSSAI of the HPLMN corresponding to the first S-NSSAI, and the third S-NSSAI is different from the second S-NSSAI.

In some implementations of the present disclosure, the third S-NSSAI is not subject to the NSSAA.

In some implementations of the present disclosure, the second S-NSSAI or a fourth S-NSSAI is a contracted S-NSSAI, the fourth S-NSSAI is an S-NSSAI of the HPLMN corresponding to the first S-NSSAI, and the fourth S-NSSAI is different from the second S-NSSAI.

In some implementations of the present disclosure, the first message is a registration accept message or a registration reject message.

It is to be understood that the device implementations and the method implementations may correspond to each other, and for similar illustrations, reference may be made to the method implementations. Specifically, the core network device 600 illustrated in FIG. 7 may correspond to the corresponding subjects for performing the methods 200 to 400 in implementations of the present disclosure, and the aforementioned and other operations and/or functions of the respective units in the core network device 600 are respectively for realizing the corresponding processes in the methods in FIG. 3 to FIG. 5, which will not be repeated here for the sake of brevity.

The communication device in implementations of the present disclosure is illustrated above from the perspective of function modules with reference to the accompanying drawings. It is to be understood that the function modules can be implemented in the form of hardware, can also be implemented by instructions in the form of software, and can also be implemented by a combination of hardware and software modules.

Specifically, each step in the method implementations in implementations of the present disclosure can be completed by hardware integrated logic circuits in the processor and/or instructions in the form of software, and the steps of the method disclosed in implementations of the present disclosure can be directly embodied as being completed by a hardware decoding processor or a combination of hardware and software modules in the decoding processor.

Optionally, the software modules may be located in a random access memory (RAM), a flash memory, a read-only memory (ROM), a programmable ROM (PROM), an electrically erasable programmable memory, a register, and other storage media mature in the art. The storage medium is located in the memory. The processor reads information in the memory, and completes the steps in the above method implementations in combination with hardware in the processor.

For example, the communication units referred to above may be implemented by transceivers, respectively.

Figure 8:
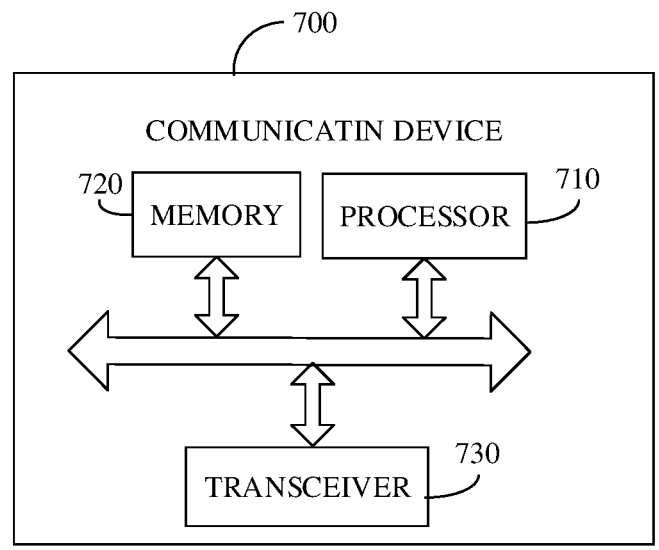
FIG. 8 is a schematic block diagram illustrating a communication device provided in implementations of the disclosure.

FIG. 8 is a schematic structural diagram illustrating a communication device 700 according to implementations of the present disclosure.

Referring to FIG. 8, the communication device 700 may include a processor 710.

The processor 710 can call and run a computer program in the memory to implement the methods in implementations of the present disclosure.

Continuing to refer to FIG. 8, the communication device 700 may further include a memory 720.

The memory 720 may be used to store an indication, and may also be used to store codes, instructions, etc. executed by the processor 710. The processor 710 can call and execute a computer program in the memory 720 to implement the methods in implementations of the present disclosure. The memory 720 may be a separate device independent of the processor 710, or may be integrated in the processor 710.

Continuing to refer to FIG. 8, the communication device 700 may also include a transceiver 730.

The processor 710 can control the transceiver 730 to communicate with other devices, and specifically, can send information or data to other devices, or receive information or data sent by other devices. The transceiver 730 may include a transmitter and a receiver. The transceiver 730 may further include one or more antennas.

It should be understood that components in the communication device 700 are connected through a bus system, where the bus system includes a power bus, a control bus and a status signal bus in addition to a data bus.

It is also to be understood that the communication device 700 may be a terminal device in implementations of the present disclosure, and the communication device 700 can implement corresponding processes implemented by the terminal device in each method in implementations of the present disclosure, that is, the communication device 700 in implementations of the present disclosure may correspond to the terminal device 500 in implementations of the present disclosure, and may correspond to the corresponding subject that performs the methods 200 to 400 according to implementations of the present disclosure, which will not be repeated here for brevity. Similarly, the communication device 700 may be a core network device in implementations of the present disclosure, and the communication device 700 may implement corresponding processes implemented by the network device in each method in implementations of the present disclosure. That is, the communication device 700 in implementations of the present disclosure may correspond to the core network device 600 in implementations of the present disclosure, and may correspond to the corresponding subject that performs the methods 200 to 400 according to implementations of the present disclosure, which is not repeated here for brevity.

In addition, a chip is further provided in implementations of the present disclosure.

For example, the chip may be an integrated circuit chip, which has signal processing capability, and can implement or execute various methods, steps and logical block diagrams disclosed in implementations of the present disclosure. The chip may also be referred to as a system-level chip, a system chip, a chip system, a system on a chip, or the like. Optionally, the chip can be applied to various communication devices, so that the communication device equipped with the chip can execute the methods, steps and logic block diagrams disclosed in implementations of the present disclosure.

Figure 9:
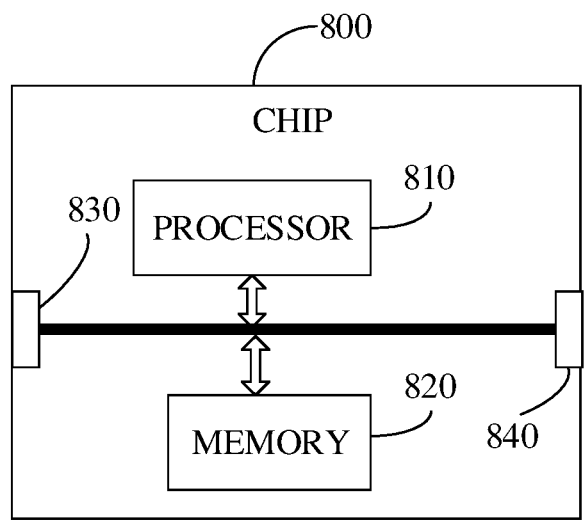
FIG. 9 is a schematic block diagram illustrating a chip provided in implementations of the disclosure.

FIG. 9 is a schematic structural diagram illustrating a chip 800 according to implementations of the present disclosure.

Referring to FIG. 9, the chip 800 includes a processor 810.

The processor 810 can invoke and run a computer program in the memory to implement the method in implementations of the present disclosure.

Continuing to refer to FIG. 9, the chip 800 may further include a memory 820.

The processor 810 can invoke and run a computer program in the memory 820 to implement the method in implementations of the present disclosure. The memory 820 may be configured to store an indication, and may also be configured to store codes, instructions and the like executed by the processor 810. The memory 820 may be a separate device independent of the processor 810, or may be integrated in the processor 810.

Continuing to refer to FIG. 9, the chip 800 may further include an input interface 830.

The processor 810 may control the input interface 830 to communicate with other devices or chips, and specifically, may acquire information or data sent by other devices or chips.

Continuing to refer to FIG. 9, the chip 800 may further include an output interface 840.

The processor 810 can control the output interface 840 to communicate with other devices or chips, and specifically, can output information or data to other devices or chips.

It is to be understood that the chip 800 can be applied to a network device in implementations of the present disclosure, and the chip can implement the corresponding processes implemented by the network device in each method in implementations of the present disclosure, and can also implement the corresponding processes implemented by the terminal device in each method in implementations of the present disclosure, which will not be repeated here for the sake of brevity.

It is also to be understood that components in the chip 800 are connected through a bus system, where the bus system includes a power bus, a control bus and a status signal bus in addition to a data bus.

The processor involved in the above illustration may include but is not limited to: a general-purpose processor, a digital signal processor (DSP), an application specific integrated circuit (ASIC), a field programmable gate array (FPGA) or other programmable logic devices, a discrete gate or a transistor logic device, a discrete hardware component, and so on.

The processor may be used to implement or execute the methods, steps and logical block diagrams disclosed in implementations of the present disclosure. The steps of the methods disclosed in implementations of the present disclosure can be directly embodied as being executed by a hardware decoding processor, or executed by a combination of hardware and software modules in the decoding processor. The software module may be located in a RAM, a flash memory, a ROM, a PROM or an erasable programmable memory, a register and other storage media mature in the art. The storage medium is located in the memory, and the processor reads the information in the memory, and completes the steps of the above method in combination with hardware of the processor.

The memory mentioned above includes but is not limited to: a volatile memory and/or non-volatile memory. The non-volatile memory may be a ROM, a PROM, an erasable PROM (EPROM), an electrically EPROM (EEPROM) or a flash memory. The volatile memory may be a RAM, which acts as an external cache. By way of example and not limitation, many forms of RAM are available, such as a static RAM (SRAM), a dynamic RAM (DRAM), a synchronous DRAM (SDRAM), a double data rate synchronous dynamic random access memory (DDR SDRAM), an enhanced SDRAM (ESDRAM), a synch link DRAM (SLDRAM) and a direct rambus RAM (DR RAM).

It is to be noted that the memory described herein is intended to include these and any other suitable types of memory.

A computer-readable storage medium for storing a computer program is also provided in implementations of the present disclosure. The computer-readable storage medium stores one or more programs including instructions that, when executed by a portable electronic device including multiple application programs, enable the portable electronic device to perform the methods 200 to 400 in illustrated implementations.

Optionally, the computer-readable storage medium can be applied to a network device in implementations of the present disclosure, and the computer program causes the computer to execute the corresponding processes implemented by the network device in each method in implementations of the present disclosure, which will not be repeated here for brevity.

Optionally, the computer-readable storage medium can be applied to the mobile terminal/terminal device in implementations of the present disclosure, and the computer program causes the computer to execute the corresponding processes implemented by the mobile terminal/terminal device in each method in implementations of the present disclosure, which will not be repeated here for brevity.

A computer program product, including a computer program, is also provided in implementations of the present disclosure.

Optionally, the computer program product can be applied to the network device in implementations of the present disclosure, and the computer program enables the computer to execute the corresponding processes implemented by the network device in each method in implementations of the present disclosure, which is not repeated here for brevity.

Optionally, the computer program product can be applied to the mobile terminal/terminal device in implementations of the present disclosure, and the computer program causes the computer to execute the corresponding processes implemented by the mobile terminal/terminal device in each method in implementations of the present disclosure, which is not repeated here for brevity.

A computer program is also provided in implementations of the present disclosure. When the computer program is executed by the computer, the computer can execute the methods 200 to 400 in implementations illustrated.

Optionally, the computer program can be applied to the network device in implementations of the present disclosure, and when the computer program runs on the computer, the computer program causes the computer to execute the corresponding processes implemented by the network device in each method in implementations of the present disclosure, which will not be repeated here for brevity.

In addition, in implementations of the present disclosure a communication system is also provided. The communication system may include the above-mentioned terminal device and the core network device to construct the communication system 100 as illustrated in FIG. 1, which is not repeated here for brevity. It is to be noted that the terms "system" and the like in this text may also be referred to as a "network management architecture" or "network system" and the like.

It is also to be understood that the terminology used in implementations of the present disclosure and the appended claims is for the purpose of describing particular implementations only and is not intended to limit implementations of the present disclosure.

For example, as used in implementations of the present disclosure and the appended claims, the singular forms "a", "said", "above" and "the" are intended to include the plural forms as well, unless the context clearly dictates otherwise.

Those skilled in the art can realize that the units and algorithm steps of each example described in conjunction with the implementations disclosed herein can be implemented in electronic hardware, or a combination of computer software and electronic hardware. Whether these functions are performed in hardware or software depends on the specific application and design constraints of the technical solution. Skilled artisans may use different methods for implementing the described functionality for each particular application, but such implementations should not be considered beyond the scope of implementations of the present disclosure.

If implemented in the form of software function units and sold or used as a stand-alone product, it may be stored in a computer-readable storage medium. Based on such understanding, in implementations of the present disclosure the essential technical solutions, the parts that contribute to the related art or part of the technical solutions can be embodied in the form of software products, and the computer software products may be stored in a storage medium, including several instructions to cause a computer device (which may be a personal computer, server, or network device, etc.) to perform all or part of the steps of the methods in implementations of the present disclosure. The aforementioned storage medium may include various media that can store program codes such as a U disk, a mobile hard disk, a ROM, a RAM, a magnetic disk or an optical disk.

Those skilled in the art can clearly understand that, for the convenience and brevity of illustration, for specific working process of the systems, devices, and units described above, reference can be made to the corresponding process in the foregoing method implementations, which is not repeated here.

In several implementations provided in the present disclosure, it should be understood that the disclosed systems, devices and methods can be implemented in other ways.

For example, the division of units, modules or components in the device implementations described above is only a logical function division, and there may be other division methods in actual implementation. For example, multiple units or modules or components may be combined or integrated into another system, or some units or modules or components may be ignored or not implemented.

For another example, the above-mentioned units/modules/components described as separate/display components may or may not be physically separated, that is, may be located in one place, or may be distributed to multiple network units. Some or all of the units/modules/components may be selected according to actual needs to achieve the purpose in implementations of the present disclosure.

Finally, it is to be noted that the mutual coupling or direct coupling or communication connection illustrated or discussed above may be indirect coupling or communication connection between devices or units through some interfaces, which may be electrical, mechanical or other forms.

The above contents are only specific implementation manners of implementations of the present disclosure, but the scope of protection in implementations of the present disclosure is not limited to this. Any person skilled in the art can easily think of changes or substitutions within the technical scope disclosed in implementations of the present disclosure. Therefore, the scope of protection in implementations of the present disclosure should be subject to the scope of protection of the claims.

What is claimed is:

1. A method for wireless communication, the method being applied to a terminal device not supporting network slice-specific authentication and authorization (NSSAA), and the method comprising:

sending, by the terminal device, a second message to an access and mobility management function (AMF), wherein the second message is used for requesting for registering with a network slice, the second message contains a first requested network slice selection assistance information (NSSAI), the first requested NSSAI comprises a first single-network slice selection assistance information (S-NSSAI) and at least one S-NSSAI of home public land mobile network (HPLMN) corresponding to the first S-NSSAI, the at least one S-NSSAI comprises a second S-NSSAI, and the second S-NSSAI is subject to the NSSAA; and receiving, by the terminal device, a first message sent by the AMF, wherein the first message does not contain the first S-NSSAI.

2. The method of claim 1, wherein the first message contains an allowed NSSAI and/or a rejected NSSAI, wherein:
on condition that the first message contains the allowed NSSAI, the allowed NSSAI does not comprise the first S-NSSAI; and
on condition that the first message contains the rejected NSSAI, the rejected NSSAI does not comprise the first S-NSSAI.

3. The method of claim 1, wherein the second message is a registration request message, and the first message is a registration accept message or a registration reject message.

4. The method of claim 1, further comprising:
sending, by the terminal device, a third message to the AMF, wherein the third message contains a second requested NSSAI, the second requested NSSAI comprises the first S-NSSAI and a third S-NSSAI, the third S-NSSAI is an S-NSSAI of the HPLMN corresponding to the first S-NSSAI, the third S-NSSAI is different from the second S-NSSAI, and the third S-NSSAI is not subject to the NSSAA.

5. A method for wireless communication, comprising:
receiving, by an access and mobility management function (AMF), a second message sent by a terminal device, wherein the second message is used for requesting for registering with a network slice, the second message contains a first requested network slice selection assistance information (NSSAI), the first requested NSSAI comprises a first single-network slice selection assistance information (S-NSSAI) and at least one S-NSSAI of home public land mobile network (HPLMN) corresponding to the first S-NSSAI, the at least one S-NSSAI comprises a second S-NSSAI, and the second S-NSSAI is subject to network slice-specific authentication and authorization (NSSAA); and
sending, by the AMF, a first message to the terminal device, wherein the first message does not contain the first S-NSSAI.

6. The method of claim 5, wherein the first message contains an allowed NSSAI and/or a rejected NSSAI, wherein:
on condition that the first message contains the allowed NSSAI, the allowed NSSAI does not comprise the first S-NSSAI; and
on condition that the first message contains the rejected NSSAI, the rejected NSSAI does not comprise the first S-NSSAI.

7. The method of claim 5, wherein the second message is a registration request message, and the first message is a registration accept message or a registration reject message.

8. The method of claim 5, further comprising:
receiving, by the AMF, a third message sent by the terminal device, wherein the third message contains a second requested NSSAI, the second requested NSSAI comprises the first S-NSSAI and a third S-NSSAI, the third S-NSSAI is an S-NSSAI of the HPLMN corresponding to the first S-NSSAI, the third S-NSSAI is different from the second S-NSSAI, and the third S-NSSAI is not subject to the NSSAA.

9. A terminal device, the terminal device not supporting network slice-specific authentication and authorization (NSSAA), and the terminal device comprising:
a transceiver;
a processor; and
a memory storing a computer program;
the computer program being executed by the processor to cause the transceiver to:
send a second message to an access and mobility management function (AMF), wherein the second message is used for requesting for registering with a network slice, the second message contains a first requested network slice selection assistance information (NSSAI), the first requested NSSAI comprises a first single-network slice selection assistance information (S-NSSAI) and at least one S-NSSAI of home public land mobile network (HPLMN) corresponding to the first S-NSSAI, the at least one S-NSSAI comprises a second S-NSSAI, and the second S-NSSAI is subject to the NSSAA; and
receive a first message sent by the AMF, wherein the first message does not contain the first S-NSSAI.

10. The terminal device of claim 9, wherein the first message contains an allowed NSSAI and/or a rejected NSSAI, wherein
on condition that the first message contains the allowed NSSAI, the allowed NSSAI does not comprise the first S-NSSAI; and
on condition that the first message contains the rejected NSSAI, the rejected NSSAI does not comprise the first S-NSSAI.

11. The terminal device of claim 9, wherein the second message is a registration request message, and the first message is a registration accept message or a registration reject message.

12. The terminal device of claim 9, wherein the computer program is further executed by the processor to cause the transceiver to:
send a third message to the AMF, wherein the third message contains a second requested NSSAI, the second requested NSSAI comprises the first S-NSSAI and a third S-NSSAI, the third S-NSSAI is an S-NSSAI of the HPLMN corresponding to the first S-NSSAI, the third S-NSSAI is different from the second S-NSSAI, and the third S-NSSAI is not subject to the NSSAA.

13. A core network device, comprising:
a transceiver;
a processor; and
a memory storing a computer program;
the computer program being executed by the processor to cause the transceiver to:
receive a second message sent by a terminal device, wherein the second message is used for requesting for registering with a network slice, the second message contains a first requested network slice selection assistance information (NSSAI), the first requested NSSAI comprises a first single-network slice selection assistance information (S-NSSAI) and at least one S-NSSAI of home public land mobile network (HPLMN) corresponding to the first S-NSSAI, the at least one S-NSSAI comprises a second S-NSSAI, and the second S-NSSAI is subject to network slice-specific authentication and authorization (NSSAA); and send a first message to the terminal device, wherein the first message does not contain the first S-NSSAI.

14. The core network device of claim 13, wherein the first message contains an allowed NSSAI and/or a rejected NSSAI, wherein on condition that the first message contains the allowed NSSAI, the allowed NSSAI does not comprise the first S-NSSAI; and on condition that the first message contains the rejected NSSAI, the rejected NSSAI does not comprise the first S-NSSAI.

15. The core network device of claim 13, wherein the second message is a registration request message, and the first message is a registration accept message or a registration reject message.

16. The core network device of claim 13, wherein the computer program is further executed by the processor to cause the transceiver to:

receive a third message sent by the terminal device, wherein the third message contains a second requested NSSAI, the second requested NSSAI comprises the first S-NSSAI and a third S-NSSAI, the third S-NSSAI is an S-NSSAI of the HPLMN corresponding to the first S-NSSAI, the third S-NSSAI is different from the second S-NSSAI, and the third S-NSSAI is not subject to the NSSAA.

* * * * *